US 12,135,049 B2

(12) United States Patent
Cliff

(10) Patent No.: US 12,135,049 B2
(45) Date of Patent: *Nov. 5, 2024

(54) INTELLIGENT FILTRATION FOR ELECTRIC-HYDRAULIC WORK VEHICLES

(71) Applicant: Deere & Company, Moline, IL (US)

(72) Inventor: Michael J. Cliff, Coffeyville, KS (US)

(73) Assignee: DEERE & COMPANY, Moline, IL (US)

( * ) Notice: Subject to any disclaimer, the term of this patent is extended or adjusted under 35 U.S.C. 154(b) by 596 days.

This patent is subject to a terminal disclaimer.

(21) Appl. No.: 17/217,018

(22) Filed: Mar. 30, 2021

(65) Prior Publication Data

US 2022/0316502 A1    Oct. 6, 2022

(51) Int. Cl.
 *F15B 21/041*   (2019.01)
 *B01D 29/52*    (2006.01)

(52) U.S. Cl.
 CPC ............ *F15B 21/041* (2013.01); *B01D 29/52* (2013.01); *F15B 2211/615* (2013.01)

(58) Field of Classification Search
 CPC ....... B01D 29/52; B01D 36/02; E02F 9/2058; E02F 9/226; E02F 9/00; E02F 9/22; F15B 21/041; F15B 21/087; F15B 21/00; F15B 21/04; F16N 39/06; F16N 2039/007; F16H 21/041
 USPC ..................................................... 210/340
 See application file for complete search history.

(56) References Cited

U.S. PATENT DOCUMENTS

2015/0129513 A1 *  5/2015  Gilmore, Jr. ......... B01D 35/143
                                                              210/85
2017/0241445 A1 *  8/2017  Shang .................... F15B 21/14

FOREIGN PATENT DOCUMENTS

DE       102022200161 A1    8/2022
EP           3093398 A1 *  11/2016  ............. B66C 13/20

OTHER PUBLICATIONS

German Search Report issued in application No. DE102022201269.0 dated Mar. 7, 2023 (08 pages).

* cited by examiner

*Primary Examiner* — Akash K Varma
(74) *Attorney, Agent, or Firm* — KLINTWORTH & ROZENBLAT IP LLP

(57) ABSTRACT

An intelligent work vehicle filtration system includes a hydraulic subsystem, a controller architecture, and an electric drive subsystem containing a battery pack. A hydraulic subsystem includes, in turn, a fine filter device having a first filter efficiency, a coarse filter device having a second filter efficiency less than the first filter efficiency, a hydraulic circuit in which the fine filter device and the coarse filter device are positioned, and a hydraulic pump controllable to circulate hydraulic fluid about the hydraulic circuit. During operation of the intelligent work vehicle filtration system, the controller architecture selectively places the intelligent work vehicle filtration system in an externally-powered filter mode in which hydraulic flow is directed through the fine filter device, while bypassing the coarse filter device, when the electric drive subsystem is electrically coupled to an external power supply utilized to charge the battery pack.

20 Claims, 5 Drawing Sheets

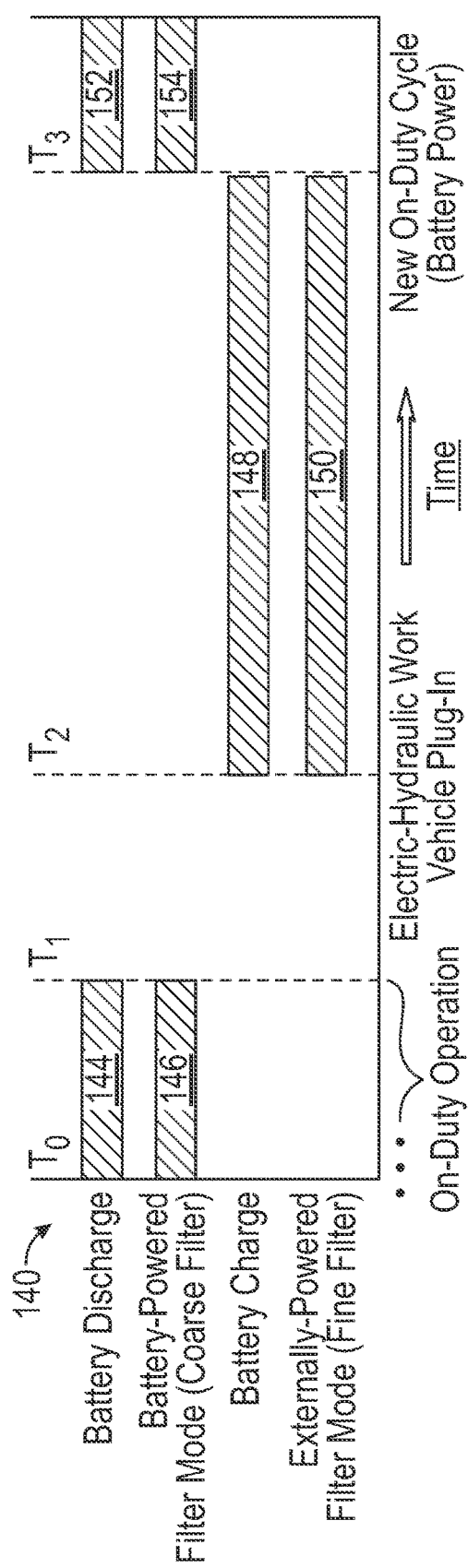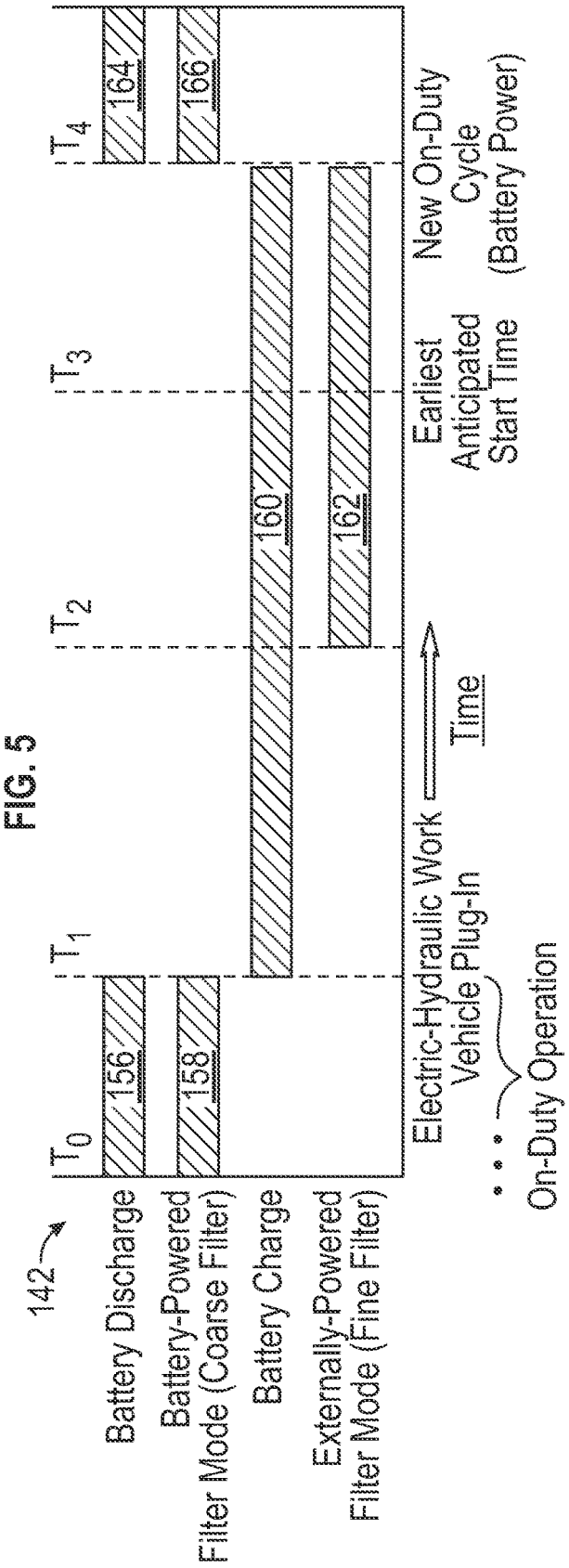

INTELLIGENT FILTRATION FOR ELECTRIC-HYDRAULIC WORK VEHICLES

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to systems and methods for strategically varying the filter performance and energy demands of hydraulic filtration systems onboard electric-hydraulic work vehicles based, at least in part, on vehicle charging status.

BACKGROUND OF THE DISCLOSURE

Work vehicles are commonly equipped with sizable hydraulic systems, which aid in lifting and manipulating heavy loads, carrying-out demolition and digging actions, and performing other energy-demanding tasks during work vehicle operation. Examples of work vehicles equipped with robust hydraulic systems include various types of loaders, excavators, log skidders, tractors, and other vehicles employed in the construction, mining, agriculture, and forestry industries. The hydraulic systems onboard such work vehicles often contain relatively large volumes of hydraulic fluid (e.g., upwards of 40 gallons or approximately 151 liters of oil), the pressurized flow of which is controlled to animate hydraulic cylinders, hydraulic motors, and other hydraulic actuators. In certain instances, work vehicles are further equipped with actively-lubricated axle and drivetrain gearbox assemblies through which oil or another liquid lubricant (also encompassed by the term "hydraulic fluid" herein) is circulated to provide continual lubrication during operation. Regardless of whether a work vehicle hydraulic system provides active lubrication functions, hydraulic actuation functions, or a combination of such functions, the hydraulic fluid within the system is ideally maintained in a relatively clean, low contaminant state to promote optimal hydraulic system operation, while prolonging the useful lifespan of the hydraulic fluid and the associated hydraulic components.

SUMMARY OF THE DISCLOSURE

An intelligent work vehicle filtration system is deployed onboard an electric-hydraulic (E/H) work vehicle. In embodiments, the intelligent work vehicle filtration system includes a hydraulic subsystem, a controller architecture, and an electric drive subsystem containing a battery pack. A hydraulic subsystem includes, in turn, a fine filter device having a first filter efficiency, a coarse filter device having a second filter efficiency less than the first filter efficiency, a hydraulic circuit in which the fine filter device and the coarse filter device are positioned, and a hydraulic pump controllable to circulate hydraulic fluid about the hydraulic circuit. During operation of the intelligent work vehicle filtration system, the controller architecture selectively places the intelligent work vehicle filtration system in an externally-powered filter mode in which hydraulic flow is directed through the fine filter device, while bypassing the coarse filter device, when the electric drive subsystem is electrically coupled to an external power supply utilized to charge the battery pack.

A method is carried-out by a controller architecture, which is contained within an intelligent work vehicle filtration system onboard an E/H work vehicle. The E/H work vehicle includes a hydraulic subsystem and an electric drive subsystem, which contain a hydraulic pump and a battery pack, respectively. Embodiments of the method include the step or process of monitoring when the electric drive subsystem is electrically coupled to an external power supply utilized to charge the battery pack. The method further includes the step or process of, based at least partly on whether the electric drive subsystem is electrically coupled to the external power supply, selectively placing the intelligent work vehicle filtration system in: (i) an externally-powered filter mode in which hydraulic flow is directed through a fine filter device contained in the hydraulic subsystem, while bypassing a coarse filter device further contained in the hydraulic subsystem; and (ii) a battery-powered filter mode in which hydraulic flow is directed through the coarse filter device, while bypassing the fine filter device, to reduce energy demands placed on the battery pack when powering the hydraulic pump during operation of the E/H work vehicle.

The details of one or more embodiments are set forth in the accompanying drawings and the description below. Other features and advantages will become apparent from the description, the drawings, and the claims.

BRIEF DESCRIPTION OF THE DRAWINGS

At least one example of the present disclosure will hereinafter be described in conjunction with the following figures:

FIG. 5 graphically illustrates a schedule-independent intelligent filtration scheme, which can be implemented by the intelligent work vehicle filtration system when performing the example method set forth in FIG. 2 in embodiments; and FIG. 6 graphically illustrates a schedule-based intelligent filtration scheme, which can be implemented by the intelligent work vehicle filtration system when performing the example method set forth in FIG. 2 in further embodiments.

Figure 1:
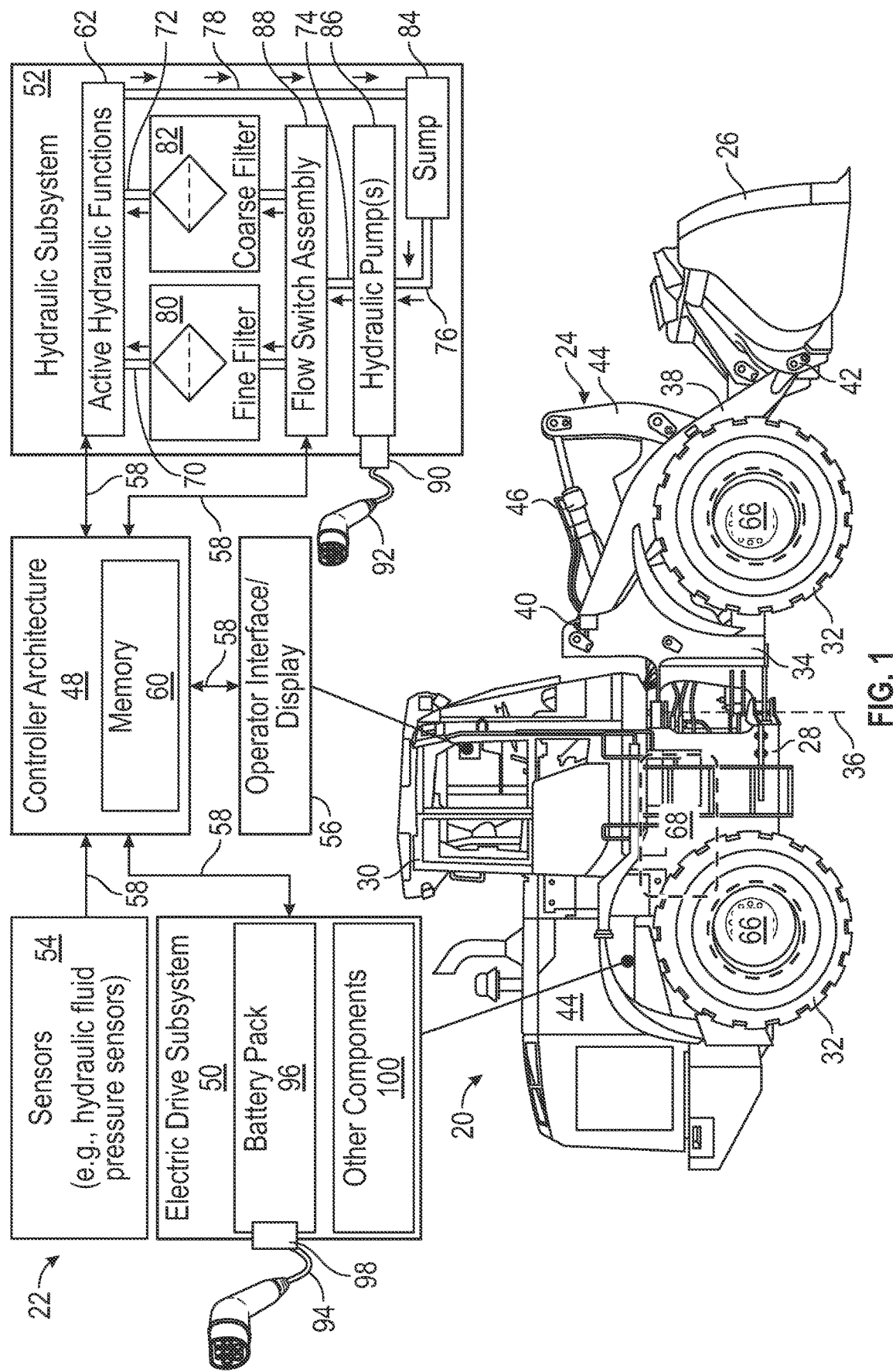
FIG. 1 schematically illustrates an electric-hydraulic (E/H) work vehicle (here, an E/H wheel loader) equipped with an intelligent work vehicle filtration system, as presented in accordance with an example embodiment of the present disclosure.

Like reference symbols in the various drawings indicate like elements. For simplicity and clarity of illustration, descriptions and details of well-known features and techniques may be omitted to avoid unnecessarily obscuring the example and non-limiting embodiments of the invention described in the subsequent Detailed Description. It should further be understood that features or elements appearing in the accompanying figures are not necessarily drawn to scale unless otherwise stated.

DETAILED DESCRIPTION

Embodiments of the present disclosure are shown in the accompanying figures of the drawings described briefly above. Various modifications to the example embodiments may be contemplated by one of skill in the art without departing from the scope of the present invention, as set forth in the appended claims.

Filter Performance Terminology

As appearing herein, the terms "filter efficiency," "filter efficacy," and "filter performance" are utilized interchangeably to refer to the effectiveness of a hydraulic filter device, such as a media-containing oil filter, in removing contaminants from a hydraulic stream passed through the filter device. Hydraulic filter efficiency is commonly described in terms of beta ($\beta$) ratios or ratings, which may be defined utilizing the following equation in which the variable x represents a contaminant particle size in microns:

$$\beta x = \frac{\text{no. of particles upstream of filter} > x \text{ microns}}{\text{no. of particles downstream of filter} > x \text{ microns}}$$

As further appearing herein, the terms "coarse" and "fine" are utilized to describe the comparative performance levels or efficacies of different filter devices contained in a given hydraulic subsystem, which is deployed onboard an electric-hydraulic work vehicle. These terms are utilized strictly in a comparative or relative sense, with a first filter device contained in a work vehicle hydraulic subsystem identified as the "fine filter device" when more effective at filtering contaminants from a hydraulic stream than is a second filter device (the "coarse filter device") further contained in the hydraulic subsystem. Thus, in the context of a particular work vehicle hydraulic subsystem, a first filter device having a relatively high filter effectiveness (e.g., as indicated by a first relatively high $\beta$ ratio) may be referred to as a "coarse filter device" providing that the hydraulic subsystem further includes a second filter device having a still higher filter effectiveness (e.g., as indicated by a second $\beta$ ratio greater than the first $\beta$ ratio).

Overview

As previously indicated, certain industrial work vehicles are equipped with relatively robust hydraulic systems utilized to power hydraulic actuators, to provide continual liquid lubricant flow through actively-lubricated assemblies, or to provide both such functions during work vehicle operation. Given their relative size and complexity, work vehicle hydraulic systems are often prime energy consumers onboard many work vehicle platforms. Energy may be expended in maintaining large volumes of hydraulic fluid within desired temperature ranges, particularly when rapidly heating larger volumes of hydraulic fluid to elevated temperatures under cold start conditions. So too is energy expended in supporting high performance filtering of large hydraulic fluid volumes to maintain the hydraulic fluid in a high quality, low contaminant state across multiple on-duty/off-duty cycles of a given work vehicle. The provision of reliable, high performance hydraulic filtration is of fundamental importance in the context of many work vehicle platforms given the critical nature of hydraulically-actuated work vehicle functions and the debris-laden environments in which such work vehicles often operate.

Addressing further energy expenditures related to high performance hydraulic filtration, filtration-related energy expenditures vary in conjunction with filter flow rates (the volume of hydraulic fluid filtered per unit of time) and the pressure drop occurring across the filter device or devices within a hydraulic subsystem onboard a given work vehicle. The pressure drop across a given media-containing filter device, such as an oil filter containing cellulose, synthetic, or microglass filter media, is further directly related to the efficacy or performance level of the filter device. In this regard, a high performance (high $\beta$ ratio) filter device inexorably poses a relatively high resistance to hydraulic flow such that a significant pressure drop develops across the filter device during hydraulic subsystem operation. Consequently, when a given high performance (high $\beta$ ratio) filter device is inserted within a hydraulic circuit, the energy demands placed on the hydraulic pump (or pumps) utilized to circulate hydraulic fluid about the hydraulic circuit increase correspondingly. It is, of coarse, possible to reduce the pump energy demands by substituting a lower performance (lower $\beta$ ratio) filter device for the higher performance (high $\beta$ ratio) filter device within a given hydraulic circuit. However, such a substitution results in lower filter performance levels that are often unacceptable for large volume hydraulic subsystems onboard industrial work vehicles.

In the case of a non-hybrid work vehicle powered utilizing an internal combustion engine, the energy expenditure devoted to high performance hydraulic filtration is often of minimal concern due, in part, to the high energy density of liquid petroleum fuels. In the case of a work vehicle equipped with large volume hydraulic system and a hydraulic pump powered utilizing a rechargeable battery pack, however, a significant fraction of energy stored within the pack battery may be expended in supporting continuous high performance hydraulic filtration. Work vehicles of this type (including a battery-powered hydraulic pump) are referred to herein as "electric-hydraulic" work vehicles and include: (i) a hybrid work vehicle containing an internal combustion engine, an e-machine (functioning as both a motor and generator), and a hydraulic system driven utilizing battery power (e.g., via energization of one or more hydraulic pumps) in at least some operational phases of the work vehicle; (ii) purely electric or "battery" work vehicles containing an electric motor (e.g., an e-machine capable of functioning as a motor and a generator), a battery pack or module, and a hydraulic system including one or more pumps driven by the electric motor when drawing energy stores from the battery pack; and (iii) any other work vehicle containing a hydraulic system in which pressurized hydraulic flow is urged by one or more hydraulic pumps, which are principally or exclusively powered utilizing battery energy stores during at least some phases of electric-hydraulic (E/H) work vehicle operation. Further, in each of the cases above, the E/H work vehicle possesses a charging interface (e.g., socket or other connector) allowing electrical connection of the rechargeable battery pack to an external power supply, typically a regional power grid, utilizing a charging cable when the work vehicle is off-duty.

There thus exists an ongoing industrial demand for improved work vehicle filtration systems utilized onboard E/H work vehicles, which reduce energy demands associated with hydraulic filtration during on-duty work vehicle operation, while maintaining hydraulic fluid quality over prolonged periods of time and across numerous on-duty usage cycles of the E/H work vehicle. In satisfaction of this demand, the following discloses intelligent work vehicle filtration systems that utilize the greater (often, essentially limitless) electric power supply availed to the E/H work vehicle during off-duty charging to provide high efficiency hydraulic filtration when the E/H work vehicle is connected to an external power source utilized to charge the vehicle battery pack. Comparatively, during on-duty phases of work vehicle operation, hydraulic filtration is conducted at an intentionally-limited performance level maintain hydraulic fluid quality within acceptable levels, while minimizing the energy demands placed on the battery pack when powering a hydraulic pump utilized circulate hydraulic fluid about the work vehicle hydraulic circuit or circuits. Such energy savings and reduced-performance hydraulic filtration is permitted during work vehicle operation due to the strategic application of high performance filtration during off-duty phases of the E/H work vehicle operating cycle. In particular, reduced-performance hydraulic filtration is generally capable of maintaining the adequate hydraulic fluid health even despite work vehicle operation in debris-laden environments due to the initial, exceptionally low contamination state of the hydraulic fluid resulting from high performance, off-duty filtration of the hydraulic fluids when the E/H work vehicle is connected to a power grid or another external power source.

Embodiments of the intelligent work vehicle filtration system include a hydraulic subsystem, an electrical drive subsystem, and a processing subsystem or "controller architecture" coupled to the hydraulic subsystem and the electrical drive subsystem. The hydraulic subsystem includes, in turn, a hydraulic circuit, at least one hydraulic pump controllable to circulate hydraulic fluid about the hydraulic circuit, and at least two filter devices positioned within the hydraulic circuit in parallel. The filter devices include at least one fine (high performance) filter device and at least one coarse (lower performance) filter device. As previously stated, the terms "coarse" and "fine" are utilized strictly in a comparative sense herein to indicate that a first filter device (the coarse filter device) provides a lower filter efficiency or efficacy than does a second filter device (the fine filter device) within a given hydraulic subsystem. The electric drive system includes a battery pack having a rechargeable chemistry, an electric machine (e-machine) capable of operating as a motor and typically also capable of operating as a generator when back-driven, and various other components commonly included in electric drive subsystems and vehicular battery packs, as discussed more fully below.

During operation, the controller architecture selectively transitions the intelligent work vehicle filtration system between multiple distinct hydraulic filtration modes, including: (i) an externally-powered filter mode in which hydraulic flow is directed through the fine filter device, while largely or wholly bypassing the coarse filter device; and (ii) a battery-powered filter mode in which hydraulic flow is directed through the coarse filter device, while largely or wholly bypassing the fine filter device. The controller architecture selectively places the intelligent work vehicle filtration system in the externally-powered filter mode when the electric drive subsystem is electrically coupled to an external power supply, such as a power grid, utilized to charge the battery pack. Comparatively, the controller architecture selectively places the intelligent work vehicle filtration system in the battery-powered filter mode when, for example, the hydraulic pump is powered utilizing the battery pack. In this manner, the filter performance and energy demands of the hydraulic subsystem are varied in response to changes in the vehicle charging status and, specifically, in response to connection of the E/H work vehicle to an external power source utilized to charge the vehicle battery pack. Additionally, in at least some embodiments, the controller architecture may also vary the output of the hydraulic pump utilized to circulate hydraulic fluid about the hydraulic circuit when transitioning between the externally-powered and battery-powered filter modes; e.g., the controller architecture may control the hydraulic pump to provide an increased pump flow output in the externally-powered filter mode relative to the pump flow output in the battery-powered filter mode.

Embodiments the intelligent work vehicle filtration system may further be operable in one or more additional filtration modes beyond the primary filtration modes mentioned above. For example, in at least some implementations, the intelligent work vehicle filtration system may also be operable in a coarse filter override mode in which hydraulic flow is routed through the fine filter device (rather the coarse filter device) during E/H work vehicle operation, while the hydraulic pump is powered via the battery pack. When available, the coarse filter override mode may be desirably applied when one or more of the following conditions occur: (i) a fault is detected with the coarse filter device including, for example, excessive fouling of the coarse filter element; (ii) a fault is detected with the flow loop in which the coarse filter device is positioned, such as detection of excessive leakage of the hydraulic fluid; and/or (iii) operator input is received requesting activation of the coarse filter override mode. Thus, in embodiments, such a coarse filter override mode may be applied strictly an as-needed basis to leverage the provision of an independent, quasi-redundant filtering path (the fine filter path) in instances in which normal operation of the coarse filter path is interrupted in some manner. Additionally or alternatively, the controller architecture may apply the coarse filter override in response to receipt of corresponding operator input; e.g., operator input requesting activation of the coarse filter override mode in anticipation of usage of the E/H work vehicle in highly contaminated work environment, such as an enclosed environment (e.g., structural or mine environment) containing a high density of particulate airborne debris.

Varying levels of computer-implemented logic can be introduced into embodiments the intelligent work vehicle filtration system for selectively carrying-out hydraulic filtration functions when the filtration system operates in a given hydraulic filtration mode. For example, in at least some implementations, the controller architecture may determine when to place the intelligent work vehicle filtration system in the externally-powered filter mode based not only on connection of the work vehicle to an external power supply, but further based upon scheduling constrains or conditions. Such a schedule-based approach may beneficially prevent, or at least minimize, superfluous energy expenditure and component wear during high performance filtering over extended periods of work vehicle inactivity; e.g., periods of time in which the E/H work vehicle remains inactive or off-duty for multiple days in succession. In such embodiments, the controller architecture may determine an earliest anticipated start (EAS) time (the beginning of an expected operational window) and commence fine filtering of the hydraulic fluid (that is, place the intelligent work vehicle filtration system in the externally-powered filter mode) at a predetermined period of time (e.g., on the order of a few hours) prior to the EAS time. In this manner, the intelligent work vehicle filtration system can provide adequate fine filtering of the hydraulic fluid prior to on-duty of the E/H work vehicle, while minimizing unneeded filtering during prolonged periods of work vehicle inactivity. The controller architecture may determine the EAS time based upon operator input or, perhaps, infer the EAS time from historical patterns of E/H work vehicle usage. In other implementations, such schedule-based logic may not be applied by the controller architecture of the intelligent work vehicle filtration system, with the controller architecture activating the externally-powered filter mode based solely upon connection of the intelligent work vehicle filtration system to an external power source or based upon other considerations, such as ensuring that the battery pack reaches a minimum current state of charge prior to implementing the externally-powered filter mode.

The system design of the intelligent work vehicle filtration system can and will vary between embodiments, providing that the intelligent work vehicle filtration system is operable in multiple discrete or distinct filtration modes including a battery-powered filter mode and an externally-powered filter mode. This stated, in a general example embodiment in which the hydraulic circuit of the intelligent work vehicle filtration system includes first and second flow loops in which the fine and coarse filter devices are positioned in parallel, respectively, the hydraulic subsystem may further include a flow switch assembly; that is, an assembly containing one or more valves, which can be controlled by the controller to selectively direct or route hydraulic fluid through a chosen flow loop and filter device. During operation of the intelligent work vehicle filtration system, the controller architecture controls the flow switch assembly to selectively route hydraulic flow: (i) through the first flow loop and the fine filter device when the intelligent work vehicle filtration system operates in the externally-powered filter mode, and (ii) through the second flow loop and the coarse filter device when the intelligent work vehicle filtration system operates in the battery-powered filter mode. In various realizations, the flow switch assembly contains at least a first valve, which is actuated in response to commands issued by the controller architecture to selectively permit or block hydraulic flow through the first flow loop and the fine filter device. In certain embodiments, the first valve may be a first shutoff valve, which is positioned in the first flow loop and which is paired with a second shutoff valve positioned in the second flow loop. In this manner, the controller architecture may command a selected one of the shutoff valves to move into an open position, while commanding the other shutoff valve to move into a closed position to direct hydraulic flow through the appropriate flow loop, depending upon the particular filtration mode in which the intelligent work vehicle filtration system is placed at a given juncture in time. In other embodiments, a different valving and plumbing configuration may be utilized to implement the flow switch assembly, such as a configuration containing a single, 3-way valve positioned at an upstream juncture of the first and second flow loops.

Additional description of an example intelligent work vehicle filtration system will now be discussed in connection with FIGS. 1-6. While the example intelligent work vehicle filtration system is principally described below in the context of a particular type of E/H construction vehicle (namely, an E/H wheel loader), embodiments of the intelligent work vehicle filtration system can be utilized onboard various E/H work vehicles employed in a wide range of industries. In this regard, embodiments of the intelligent work vehicle filtration system may be beneficially integrated into any E/H work vehicle containing hydraulic fluid desirably maintained at relatively high quality levels, while concurrently extending per-charge battery life of the work vehicle, particularly including work vehicles equipped with sizable hydraulic systems having cumulative volumetric capacities exceeding about 110 liters or 29 gallons. A non-exhaustive list of such work vehicles includes E/H work vehicles employed in construction and mining industries (e.g., backhoe loaders, front loaders, skid loaders, and excavators), in the agricultural industry (e.g., tractors), and in the forestry industry (e.g., log skidders and feller bunchers). Accordingly, the following description should be understood as merely providing a non-limiting example context in which embodiments of the present disclosure may be better understood.

Example Intelligent Work Vehicle Filtration Systems and Associated Methods

Referring initially to FIG. 1, an E/H work vehicle (here, an E/H wheel loader 20) is equipped with an intelligent work vehicle filtration system 22 in accordance with an example embodiment of the present disclosure. In addition to the intelligent work vehicle filtration system 22, the example E/H wheel loader 20 includes a front end loader (FEL) assembly 24 terminating in a tool or implement, such a bucket 26. The FEL assembly 24 is mounted to a body or chassis 28 of the E/H wheel loader 20 and extends therefrom in a forward direction. A cabin 30 is located above a forward portion of the main chassis 28 and encloses an operator station containing a seat, operator controls, and other devices for piloting the E/H wheel loader 20. The chassis 28 of the E/H wheel loader 20 is supported by front and rear pairs of ground-engaging wheels 32. The E/H wheel loader 20 further has an articulated body such that a forward portion or a forward loader frame 34 of the E/H wheel loader 20 can rotate or pivot relative to the main chassis 28 about an upright axis 36.

The FEL assembly 24 of the E/H wheel loader 20 contains twin booms or lift arms 38, which extend from the forward loader frame 34 in a forward direction to the backside of the FEL bucket 26. At one end, each lift arm 38 is joined to the forward loader frame 34 of the wheel loader via a first pin or pivot joint 40. At a second, longitudinally-opposed end, each lift arm 38 is joined to the FEL bucket 26 via a second pin or pivot joint 42. Two lift arm cylinders (hidden from view) are further mounted between the forward loader frame 34 of the E/H wheel loader 20 and the lift arms 38. Extension of the lift arm cylinders results in rotation of the lift arms 38 about the pivot joints 40 and upward motion of the FEL bucket 26. The E/H wheel loader 20 also includes a bucket cylinder 46, which is mechanically coupled between the forward loader frame 34 and a linkage 44. A central portion of the linkage 44 is, in turn, rotatably or pivotally mounted between the lift arms 38, while an end portion of the linkage is pivotally joined to the FEL bucket 26 opposite the bucket cylinder 46. The linkage 44 may be a four-bar linkage, a Z-linkage, or a similar linkage suitable for converting translation of the bucket cylinder 46 into rotation (curling or uncurling) of the FEL bucket 26.

As schematically depicted in an upper portion of FIG. 1, the intelligent work vehicle filtration system 22 includes a controller architecture 48, an electric drive subsystem 50, a hydraulic subsystem 52, and any number of sensors 54. The wheel loader 20 also contains an operator interface 56, which can include any combination of buttons, switches, joysticks or control levers, pedals, a steering wheel, a touch screen interface, and other operator controls located within the loader cabin 30. Additionally, the operator interface 56 includes at least one display device or monitor, which is also located within the cabin 30 and which permits operators to view status information, input data, and otherwise control the E/H wheel loader 20 as conventionally known. The connections between the controller architecture 48 and the various components or subsystems 50, 52, 54, 56 of the intelligent work vehicle filtration system 22 are denoted by signal communication lines 58. The illustrated signal communication lines 58 may represent wireless connections, wired connections, or any combination thereof.

The term "controller architecture," as appearing in this document, is utilized in a non-limiting sense to refer generally to the processing components of the intelligent work vehicle filtration system 22. The controller architecture 48 of the intelligent work vehicle filtration system 22 can thus assume any form suitable for performing the processing functions described herein. The controller architecture 48 can encompass or may be associated with any practical number of processors (central and graphical processing units), onboard control computers, navigational equipment pieces, computer-readable memories, power supplies, storage devices, interface cards, and other standardized components. Further, the controller architecture 48 may include or cooperate with any number of firmware and software programs or computer-readable instructions designed to carry-out any pertinent process tasks, calculations, and control/display functions. The computer-readable instructions executed by the controller architecture 48 may be stored within a non-volatile sector of a computer-readable memory 60 further included in the intelligent work vehicle filtration system 22. While generically illustrated in FIG. 1 as a single block, the memory 60 can encompass any number and type of storage media suitable for storing computer-readable code or instructions, as well as other data utilized to support the operation of the intelligent work vehicle filtration system 22. Such other data my include data indicative of dates and times at which on-duty operation of the E/H wheel loader 20 is anticipated to occur; data defining permissible operating parameters of the hydraulic subsystem, which, if surpassed, may trigger activation of a diagnostic flag or, perhaps, trigger entry of the intelligent work vehicle filtration system 22 into the below-described coarse filter override mode; operator preference data related to the functionalities of the intelligent work vehicle filtration system 22; or other data useful in carrying-out the processes and functions described herein.

The hydraulic subsystem 52 of the E/H wheel loader 20 can include any number and type of hydraulic actuators and/or actively-lubricated assemblies, which are generically encompassed by an active hydraulic function box 62 shown in the upper right of FIG. 1. In the illustrated embodiment, specifically, the hydraulic subsystem 52 contains the above-described hydraulic cylinders 46 (bucket and lift cylinders) utilized to animated the FEL assembly 24, along with various other conventionally-known hydraulic components, such as valving, plumbing, hydraulic pumps (e.g., the below-described hydraulic pump 86), filters, hydraulic fluid conditioner devices (e.g., oil coolers), and the like. Similarly, the axle assemblies (generically represented by dashed circle graphics 66) connecting the front and rear wheel pairs 32 may be lubricated by active, pump-driven hydraulic flow during operation of the E/H wheel loader 20. The various rotating components contained in the transmission or drive-train gearbox (generically represented by dashed rectangle 68 in FIG. 1) may also be actively lubricated by continual hydraulic flow. In many instances, hydraulic fluid will not be exchanged between such actively-lubricated axle assemblies 66 and the transmission gearbox 68, with these actively-lubricated assemblies fluidly coupled to separate hydraulic circuits. In other instances, however, hydraulic fluid may be shared between actively-lubricated axle assemblies 66 (when present) and the transmission gearbox 68 during operation of the E/H wheel loader 20. The hydraulic subsystem 52 of the E/H wheel loader 20 may have a cumulative volumetric capacity exceeding 110 liters (about 29 gallons) in at least some embodiments.

In addition to the above-mentioned components, the hydraulic subsystem 52 further includes a hydraulic circuit 70, 72, 74, 76, 78 including a first flow loop 70, 74, 76, 78 and a second flow loop 72, 74, 76, 78. At least one fine filter device 80 is positioned in the first flow loop 70, 74, 76, 78, while at least one coarse filter device 82 is positioned in the second flow loop 72, 74, 76, 78 in parallel with the fine filter device 80. As previously indicated, the terms "fine" and "coarse" are utilized throughout this document strictly in a relative sense to distinguish a first filter device (here, the fine filter device 80) having a greater filter efficacy (e.g., a higher β ratio) from a second filter device (herein, the coarse filter device 82) having a lesser filter efficacy (e.g., a lower β ratio). The fine and coarse filter devices 80, 82 can each assume the form of any media-containing filter device suitable for removing contaminants from the hydraulic stream by passage through a porous media. In embodiments, and by way of non-limiting example, the fine filter device 80 and the coarse filter device 82 may assume the form of oil filters containing cellulose, fiberglass, a synthetic media, or another filter media and having different β ratios for filtering particles of a specified minimum size (e.g., between 2 and 5 microns).

The hydraulic subsystem 52 further includes a sump 84 and at least one hydraulic pump 86. When properly energized or otherwise driven, the hydraulic pump 86 draws hydraulic fluid (e.g., oil) from the sump 84 and discharges pressurized hydraulic flow from the pump outlet to urge hydraulic flow about the hydraulic circuit 70, 72, 74, 76, 78 in the manner indicated in FIG. 1 by small arrows. For purposes of illustration, the arrows shown FIG. 1 denote hydraulic flow occurring concurrently through both flow loops and both filter devices 80, 82; however, in actual implementations, hydraulic flow will typically be or exclusively (or substantially exclusively) routed through a single selected flow loop and a single filter device (either the fine filter device 80 or the coarse filter device 82) at a given juncture in time. In this regard, a flow switch assembly 88 is further positioned in the hydraulic circuit 70, 72, 74, 76, 78 and is controllable to selectively route hydraulic flow through a selected one of the first flow loop 70, 74, 76, 78 and the second flow loop 72, 74, 76, 78. The controller architecture 48 commands the flow switch assembly 74 to route hydraulic flow through the first flow loop 70, 74, 76, 78 and the fine filter device 80 when the intelligent work vehicle filtration system 22 operates in at least a first mode (e.g., the below-described externally-powered filter mode or the coarse filter override mode) and through the second flow loop 72, 74, 76, 78 and the coarse filter device 82 when the intelligent work vehicle filtration system 22 operates in at least a second mode (e.g., the below-described battery-powered filter mode).

In certain cases, a terminal 90 and an umbilical-style power cable 92 may be provided for directly powering the hydraulic pump 86 via connection to an external power supply when the intelligent work vehicle filtration system 22 operates in the externally-powered filter mode. When provided, the umbilical-style power cable 92 may be independent of a separate umbilical-style power cable 94, which is utilized to connect a rechargeable battery pack 96 within the electric drive subsystem 50 to an external power supply in embodiments. Alternatively, both the battery pack 96 of the electrical drive subsystem 50 and the hydraulic pump 86 may be connected to an external power supply via a single terminal 98 and power cable or umbilical cord; e.g., the umbilical-style power cable 94 shown on the left of FIG. 1. The power cables 92, 94 may be joined to vehicle-side charging terminals 90, 98, respectively, further included in the intelligent work vehicle filtration system 22, whether by plug-in connection of mating (e.g., male and female) connectors (in which case the power cables 92, 94 may be provided separate and apart from the E/H wheel loader 20); or, instead, in a more permanent manner such that the power cables 92, 94 remain attached to the E/H wheel loader 20 during normal vehicle usage (in which case storage compartments may be provided onboard the E/H wheel loader 20 to store the power cables 92, 94 when not in use). Again, the secondary terminal 90 and its associated secondary power cable 92 need not be provided in all realizations of the intelligent work vehicle filtration system 22 and, more generally, E/H wheel loader 20; however, when provided, these electrical components may allow current supply to the hydraulic pump 86, while bypassing the electric drive subsystem 50 to, for example, simplify integration and the wiring schemes.

The electric drive subsystem 50 further contains additional components 100 commonly utilized in conjunction with rechargeable battery packs to, for example, produce a battery module. Such components will often include electrical components for regulating the rate at which the battery pack 96 charges during plug-in charging, components for thermal regulation of the battery pack 96, components for monitoring the health of the battery pack 96, and components for monitoring the current SoC of the battery pack 96, to list but a few examples. The electric drive subsystem 50 also includes an e-machine (generically encompassed by box 100) capable of operating as an electric motor; and, perhaps, further capable of operating as a generator when back-driven to generate electrical current, as may be particularly applicable when the E/H wheel loader 20 assumes the form of a hybrid vehicle further containing a non-illustrated internal combustion engine. Various other components suitably contained in the electrical drive subsystem 50 include any number of control units (e.g., a power management unit, a battery control, and a motor/generator control unit when applicable), as well as a power distribution module. Finally, the battery pack 96 itself may also have any suitable rechargeable chemistry, such as a lithium ion chemistry or a nickel-cobalt-aluminum (NCA) chemistry. The term "battery pack," as appearing herein, is utilized in a broad sense to refer to any rechargeable battery apparatus or device, regardless of the number and type of individual cells contained therein.

During operation of the intelligent work vehicle filtration system 22, the controller architecture 48 strategically varies the filter performance and energy demands of the hydraulic subsystem 52 based, at least in part, on whether the E/H wheel loader 20 is currently connected to a power grid utilized to recharge the battery pack 96. The controller architecture 48 monitors relevant data inputs (e.g., sensor data form the electric drive subsystem 50 indicating whether the terminal 98 and the power cable 94 is electrically coupled to an external power source), and selectively transitions the intelligent work vehicle filtration system 22 between a number of unique filtration modes at appropriate junctures. These filtration modes include at least an externally-powered filter mode and a battery-powered filter mode. As indicated briefly above, the controller architecture 48 may place the intelligent work vehicle filtration system 22 in the externally-powered filter mode when the electric drive subsystem 50 is electrically coupled to an external power supply utilized to charge the battery pack 96. When the intelligent work vehicle filtration system 22 is placed in the externally-powered filter mode, hydraulic flow is routed through the fine filter device 80, while bypassing the coarse filter device 82. Comparatively, the controller architecture 48 may place the intelligent work vehicle filtration system 22 in the battery-powered filter mode when the hydraulic pump 86 is powered utilizing the battery pack 96. In this mode, hydraulic flow is directed through the coarse filter device 82, while bypassing the fine filter device 80. In certain cases, the controller architecture 48 may still further selectively place the intelligent work vehicle filtration system 22 in one or more additional filtration modes, such as coarse filter override mode, as further described below in connection with FIG. 2.

Figure 2:
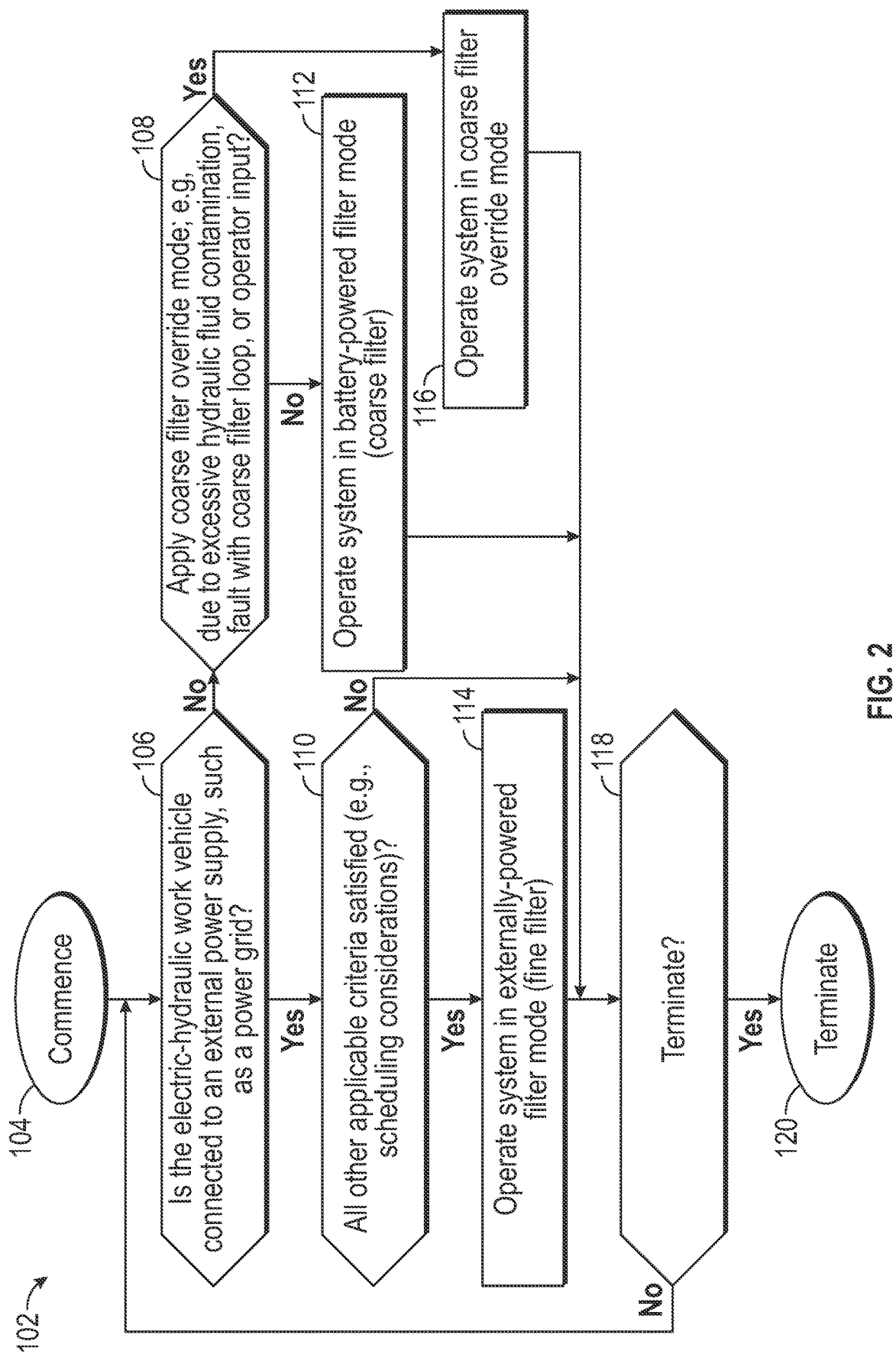
FIG. 2 is a flowchart of an example method for transitioning the intelligent work vehicle filtration system between different hydraulic filtration modes, including a battery-powered filter mode and an externally-powered filter mode.

Turning now to FIG. 2, an intelligent work vehicle filtration method 102 is presented in accordance with an example embodiment of the present disclosure. For purposes of explanation, the intelligent work vehicle filtration method 102 is described below as performed by the intelligent work vehicle filtration system 22 onboard the E/H wheel loader 20 shown in FIG. 1. It will be appreciated, however, that alternative embodiments of the intelligent work vehicle filtration method 102 can be performed by other intelligent work vehicle filtration systems onboard a wide range of E/H work vehicle platforms including, but not limited to, backhoe loaders, front loaders, skid loaders, and log skidders. The intelligent work vehicle filtration method 102 includes a number of process STEPS 104, 106, 108, 110, 112, 114, 116, 118, 120, each of which is described, in turn, below. Depending upon the particular manner in which the intelligent work vehicle filtration method 102 is implemented, each step generically illustrated in FIG. 2 may entail a single process or multiple sub-processes. Further, the steps illustrated in FIG. 2 and described below are provided by way of non-limiting example only. In alternative embodiments of the intelligent work vehicle filtration method 102, additional process steps may be performed, certain steps may be omitted, and/or the illustrated process steps may be performed in alternative sequences.

The intelligent work vehicle filtration method 102 commences at STEP 104. The intelligent work vehicle filtration method 102 may commence due to operator input initiating the method 102. Alternatively, the intelligent work vehicle filtration method 102 may commence in conjunction with activation of the E/H wheel loader 20 from a fully shutdown state. After the intelligent work vehicle filtration method 102 commences (STEP 104), the controller architecture 48 advances to STEP 106 and determines whether the E/H wheel loader 20 is presently connected to an external power supply, such as the power grid, utilized to recharge the vehicle battery pack 96. Such a connection may be established utilizing at least one power cable 92, 94, which is plugged into a suitable terminal on the E/H wheel loader 20 and/or in the surrounding charging infrastructure when the E/H wheel loader 20 is not in active use and is consequently off-duty. Appropriate charging interfaces or stations may be provided within storage bays or other structures utilized to temporarily house work vehicles when not in usage.

If determining that the E/H wheel loader 20 is not currently electrically connected to an external power supply at STEP 106, the controller architecture 48 progresses to STEP 108 and assesses whether the intelligent work vehicle filtration system 22 should be placed in either a coarse filter override mode or a battery-powered filter mode. Otherwise, the controller architecture 48 advances to STEP 110 and determines whether any and all applicable criteria are satisfied prior placing the intelligent work vehicle filtration system 22 in the externally-powered filter mode (STEP 114); the term "placing," in this context, encompassing both initially placing the intelligent work vehicle filtration system 22 in a particular filtration mode, as well as continuing to operate the intelligent work vehicle filtration system 22 in a particular filtration mode if already active. If determining that any of the criteria for entering the externally-powered filter mode are not satisfied during STEP 110, the controller architecture 48 progresses to STEP 114 and determines whether the current iteration of the intelligent work vehicle filtration method 102 should terminate. If determining during STEP 118 that the present iteration of the intelligent work vehicle filtration method 102 should terminate (e.g., due to deactivation by an operator), the controller architecture 48 progresses to STEP 120 and terminates the method 102 accordingly. If instead that the intelligent work vehicle filtration method 102 should continue, the controller architecture 48 returns to STEP 106 and again assesses whether the E/H wheel loader 20 is presently connected to a power grid or another external power source.

Referring further to STEP 110 of the intelligent work vehicle filtration method 102, the controller architecture 48 may consider schedule-based constraints in assessing whether the intelligent work vehicle filtration system 22 should be placed in the externally-powered filter mode in embodiments. In such embodiments, the controller architecture 48 of the intelligent work vehicle filtration system 22 may restrict fine hydraulic fluid filtering utilizing a schedule-based approach to prevent or at least minimize needless energy expenditure over extended off-duty periods. In this case, the controller architecture 48 may establish an earliest anticipated start (EAS) time for the E/H wheel loader 20; that is, the earliest time at which anticipated operational window of the E/H wheel loader 20 begins. The controller architecture 48 may then place the intelligent work vehicle filtration system 22 in the externally-powered filter mode (thus, commencing high performance hydraulic filtration) at a duration of time prior to the EAS time to bring the hydraulic fluid to a desired quality level prior to on-duty usage of the E/H wheel loader 20. This duration of time may be fixed time period stored in the memory 60 (e.g., on the order of 1-3 hours prior to the established EAS time); or this duration of time may be variable by an operator or may be varied based upon filtering needs inferred from sensor data indicative of current hydraulic fluid quality. In certain cases, the controller architecture 48 may determine the EAS time based upon operator input; or may infer the EAS time from historical usage of the E/H wheel loader 20. Additional discussion of such schedule-based constraints in determining when to place the E/H wheel loader 20 (or another E/H work vehicle) in the externally-powered filter mode is set-forth below in connection with FIG. 6.

When progressing to STEP 114 of the intelligent work vehicle filtration method 102, the controller architecture 48 initially places the intelligent work vehicle filtration system 22 in the externally-powered filter mode or continues to operate the system 22 in this mode if applicable. When the intelligent work vehicle filtration system 22 operates in the externally-powered filter mode, the controller architecture 48 controls the hydraulic pump 86 to circulate hydraulic fluid about the hydraulic circuit 70, 72, 74, 76, 78, with the hydraulic pump 86 powered utilizing an external power source connected to the E/H wheel loader 20. The hydraulic pump 86 may be electrically driven directly by the external power source in a manner bypassing the electric drive subsystem 50. Alternatively, the hydraulic pump 86 power may be routed through the battery pack 96, while the battery pack 96 is electrically coupled to an external power source utilized to recharge the battery pack 96; this latter scenario also considered powering of the hydraulic pump 86 via the external power source. Concurrently, the controller architecture 48 controls the flow switch assembly 88 to route hydraulic flow through the first flow loop 70, 74, 76, 78 and the fine filter device 80, while bypassing the second flow loop 72, 74, 76, 78 and the coarse filter device 82. This, in effect, provides high performance, energy-demanding filtration of the circulated hydraulic fluid, while leveraging the availability of the external power source to support the increased energy demands of the hydraulic pump 86. Following STEP 114, the controller architecture 48 progresses to STEP 118 and determines whether the current iteration of the work vehicle filtration method 102 should terminate. If determining this to be the case, the controller architecture 48 terminates the method 102 (STEP 120). Otherwise, the controller architecture 48 returns to STEP 106 and the above-described process steps repeat or loop.

If instead determining that the E/H wheel loader 20 is not connected to an external power supply during STEP 106, the controller architecture 48 progresses to STEP 108 of the work vehicle filtration method 102. During STEP 108, the controller architecture 48 determines whether the intelligent work vehicle filtration system 22 should presently operate in the battery-powered filter mode (in which case the controller architecture 48 next progresses to STEP 112) or, instead, the intelligent work vehicle filtration system 22 should presently operate in a coarse filter override mode (in which case the controller architecture 48 advances to STEP 116). As indicated in FIG. 2, the controller architecture 48 may determine that the intelligent work vehicle filtration system 22 is appropriately placed in the coarse filter override mode in response to detection of excessive hydraulic fluid contamination; in response to detection of a fault within the coarse filter loop (e.g., excessive leakage from the conduit 72, excessive leakage from the coarse filter device 82, or excessive fowling of the coarse filter device 82); or in response to detection of operator input requesting entry of the intelligent work vehicle filtration system 22 into the coarse filter override mode (e.g., due to operation or anticipated operation of the E/H wheel loader 20 in an exceptionally contaminated work environment). When the intelligent work vehicle filtration system 22 operates in the coarse filter override mode, the controller architecture 48 controls the flow switch assembly 88 to route hydraulic flow through the first flow loop 70, 74, 76, 78 and the fine filter device 80, bypassing the second flow loop 72, 74, 76, 78 and the coarse filter device 82, while the hydraulic pump 86 is powered utilizing the battery pack 96. In so doing, the intelligent work vehicle filtration system 22 leverages the availability of the fine filter device 80 to provide high performance filtering when needed or desired. Following STEP 116, the controller architecture 48 progresses to STEP 118 and again determines whether the current iteration of the work vehicle filtration method 102 should conclude (STEP 120) or continue (STEP 106).

If instead determining, during STEP 108, that the intelligent work vehicle filtration system 22 should presently operate in the battery-powered filter mode, the controller architecture 48 progresses to STEP 112 and controls the flow switch assembly 74 to route hydraulic flow through the second flow loop 72, 74, 76, 78 and the coarse filter device 82, while bypassing the first flow loop 70, 74, 76, 78 and the fine filter device 80. Afterwards, the controller architecture 48 progresses to STEP 118 and determines whether the current iteration of the work vehicle filtration method 102 should terminate, as previously described. When implementing the battery-powered filter mode at STEP 112, hydraulic filtration is conducted at an intentionally-reduced performance level or efficacy to minimize energy demands placed on the battery pack when powering the hydraulic pump during operation of the E/H wheel loader 20. Such reduced efficacy, low energy demand hydraulic filtration is generally sufficient to maintain hydraulic fluid health within optimal levels, however, due to the exceptionally low contamination state of the hydraulic fluid achieved at the outset of work vehicle usage due to the high performance hydraulic filtration carried-out by the intelligent work vehicle filtration system 22 during off-duty charging of the E/H wheel loader 20. This cycle of lower performance filtration during on-duty usage of the E/H wheel loader 20 interspersed with high performance filtration during off-duty periods of the E/H wheel loader 20 is then repeated to maintain hydraulic fluid quality over prolonged periods of time and across numerous on-duty usage cycles of the E/H wheel loader 20 or another E/H work vehicle into which the intelligent work vehicle filtration system 22 is integrated.

Figure 3:
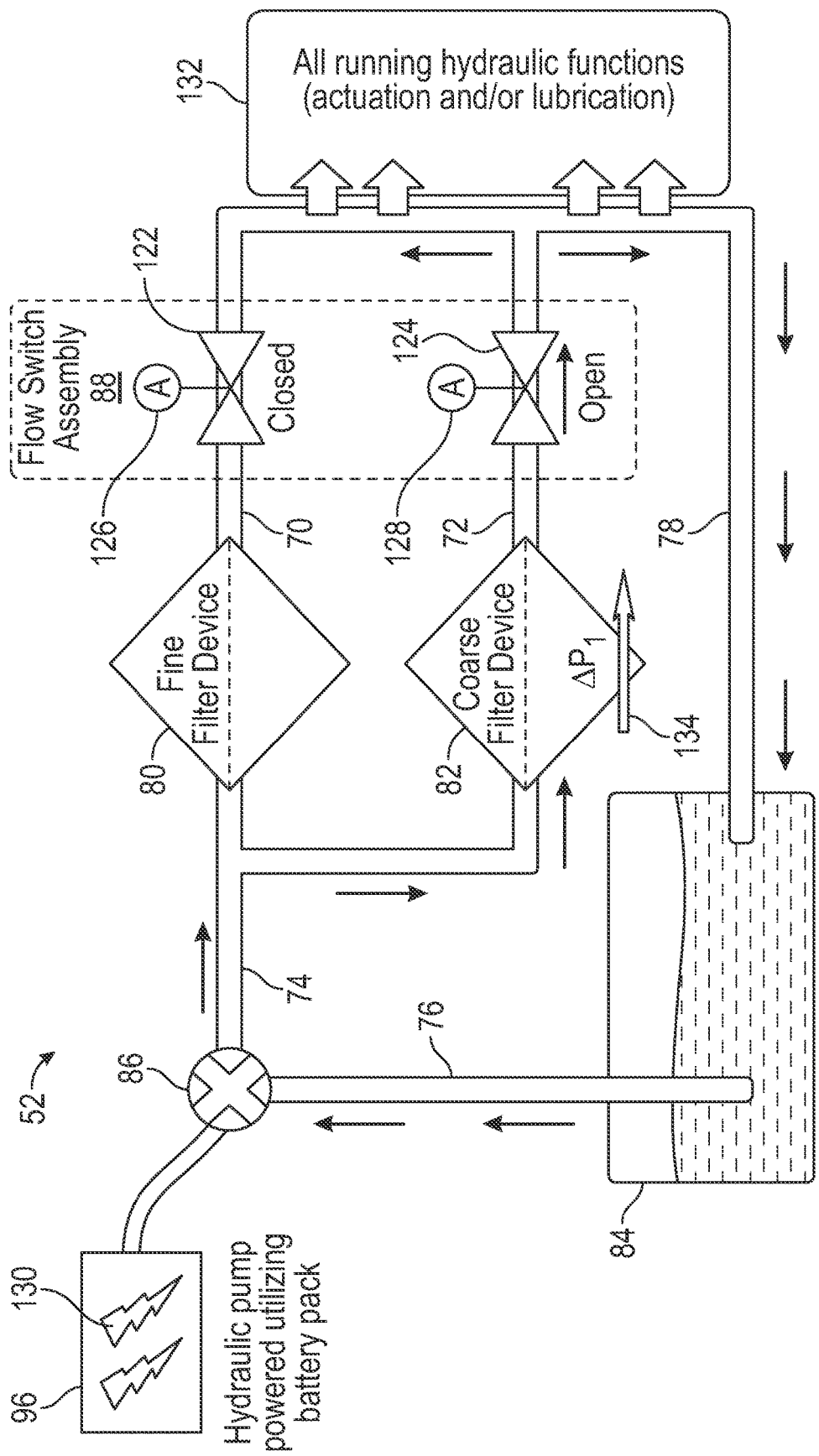
FIGS. 3 and 4 schematically illustrate an example implementation of the intelligent work vehicle filtration system (partially shown) when operating in example battery-powered and externally-powered filter modes, respectively.
Figure 4:
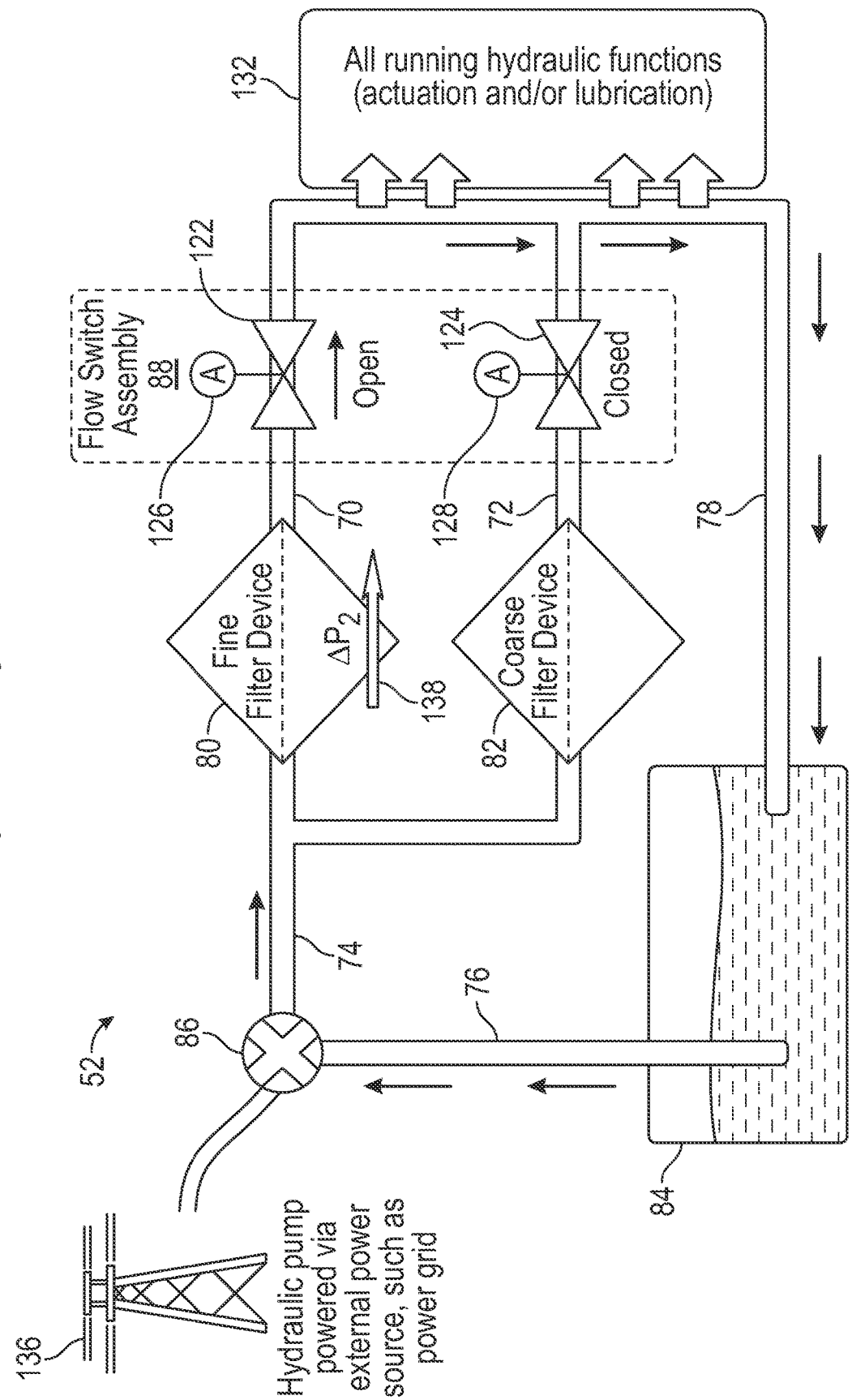

Turning next to FIGS. 3 and 4, an example implementation of the intelligent work vehicle filtration system 22 (partially shown) is schematically illustrated when operating in the above-described battery-powered and externally-powered filter modes, respectively. In this example, the flow switch assembly 88 includes two valves: (i) a first shutoff valve 122 positioned in the first flow loop 70, 74, 76, 78 downstream of the fine filter device 80; and (ii) a second shutoff valve 124 positioned in the second flow loop 72, 74, 76, 78 downstream of the coarse filter device 82 and in parallel with the first shutoff valve 122. The shutoff valves 122, 124 are schematically depicted as controlled utilizing two discrete actuators 126, 128, respectively, which are each operably coupled to the controller architecture 48 (FIG. 1). The actuators 126, 128 may assume the form of solenoids in an embodiment. In further implementations, the flow switch assembly 88 can be implemented utilizing other valving configurations, providing that the flow switch assembly 88 can be controlled by the controller architecture 48 to selectively route hydraulic flow through a chosen flow loop and filter device. Such alternative configurations include, for example, dual shutoff valve configurations in which both shutoff valves are controlled utilizing a single actuator and/or in which one or both of the shutoff valves are positioned upstream of their corresponding filter devices 80, 82. As a further possibility, the flow switch assembly 88 can be realized utilizing a single 3-way valve positioned in the hydraulic circuit 70, 72, 74, 76, 78 (e.g., at the bifurcation point of the conduit 74 leading to the different flow loops), with first and second outlets of the 3-way valve fluidly coupled to the inlets of the fine filter device 80 and the coarse filter device 82, respectively. Generally, in each of the example configurations above, the flow switch assembly 88 includes a first valve positioned in the hydraulic circuit and movable between a first position in which the first valve permits hydraulic flow through the first flow loop and the fine filter device, as well as a second position in which the first valve blocks hydraulic flow through the first flow loop and the fine filter device.

In the example battery-powered filter mode shown in FIG. 3, the hydraulic pump 86 is powered via the battery pack 96 (indicated by symbol 130), while the controller architecture 48 controls the flow switch assembly 88 to close the shutoff valve 122, while opening the shutoff valve 124. Accordingly, hydraulic fluid is routed through the second flow loop 72, 74, 76, 78 and the coarse filter device 82 to drive all presently running hydraulic functions (generically indicated by box 132). As represented by an arrow 134, a first pressure drop ($\Delta P1$) thus occurs the coarse filter device 82. The first pressure drop is relatively modest given the lower filter efficiency of the coarse filter device 82, thus reducing the energy demands or electrical load placed on the battery pack 96 by the hydraulic pump 86. Comparatively, in the example externally-powered filter mode shown in FIG. 4, the hydraulic pump 86 is powered via the external power source utilized to charge battery pack 96 (indicated by symbol 136), while the controller architecture 48 controls the flow switch assembly 88 to close the shutoff valve 124, while opening the shutoff valve 122. Hydraulic fluid is consequently routed through the first flow loop 70, 74, 76, 78 and the fine filter device 80 to drive all presently running hydraulic functions, while providing high performance hydraulic filtering.

As represented by an arrow 138 in FIG. 4, a second pressure drop ($\Delta P2$) occurs the fine filter device 82 when the intelligent work vehicle filtration system 22 operates in the externally-powered filter mode, with the second pressure drop exceeding the first pressure drop occurring the coarse filter device 82 during operation in the battery-powered filter mode such that $\Delta P2 > \Delta P1$. In at least some embodiments, the second pressure drop is at least twice the first pressure drop or, stated differently, the first pressure drop is equal to or less than one half the second pressure drop such that $0.5(\Delta P2) \geq \Delta P1$. The increased load placed on the hydraulic pump 86 is readily accommodated by the external power source 136 without decreasing the energy stores from the battery pack 96 (FIGS. 1 and 3). Further, due to such high performance off-duty filtering, on-duty operation of the E/H wheel loader 20 can commence with the hydraulic fluid in an exceptionally low contamination state to permit reduced efficacy, low energy demand hydraulic filtration during the ensuing operational phase of the E/H wheel loader 20. Finally, in certain embodiments, the controller architecture 48 may control the hydraulic pump 86 to decrease or otherwise vary the pump output when transitioning from the battery-powered filter mode (FIG. 3) to the externally-powered filter mode (FIG. 4), while this may not be the case in other embodiments.

As previously indicated, scheduled-based time constraints may be beneficially considered by the controller architecture 48 in determining the appropriate junctures at which the intelligent work vehicle filtration system 22 should operate in the externally-powered filter mode (FIG. 4). Consider, in this regard, the example scenarios plotted by graphs 140, 142 appearing in FIGS. 5 and 6, respectively. Addressing first the graph 140 shown in FIG. 5, an example control scheme is presented for placing the intelligent work vehicle filtration system 22 in the externally-powered filter mode independent of scheduling concerns, with time plotted on the horizontal axis or ordinate and progressing from left to right. The example scenario begins at timepoint T0, which occurs at a more-or-less arbitrary point during on-duty operation of the E/H wheel loader 20. The E/H wheel loader 20 is shutdown or placed in a quiescent, non-working state at timepoint T1, with the battery-powered filter mode becoming active and the battery pack 96 driving the hydraulic pump 86 during this time period (T0-T1), as indicated by bars 144, 146 within the graph 140. In this example, a duration of time passes from shutdown (or off-duty usage) of the E/H wheel loader 20 (timepoint T1) until the E/H wheel loader 20 is connected to a vehicle-external power supply, such as the power grid, via one or more both of the connector cables 92, 94. The intelligent work vehicle filtration system 22 commences high performance filtration of the hydraulic fluid at timepoint T2 and concurrent charging of the battery pack 96 in response to plug-in of the E/H wheel loader 20, as indicated in FIG. 5 by bars 148, 150. Subsequently, at timepoint T3, the E/H wheel loader 20 is disconnected from the battery-external power supply and again enters an on-duty usage cycle. Accordingly, and as indicated by bars 152, 154, the intelligent work vehicle filtration system 22 resumes operation in the battery-powered filter mode, with the battery pack 96 powering the hydraulic pump 86 to provide reduced performance, energy-saving filtration during the ensuing on-duty phase of the E/H wheel loader operating cycle.

Referring lastly to the graph 142 shown in FIG. 6, an example schedule-based filtration scheme suitably applied by the controller architecture 48 in determining when to place the intelligent work vehicle filtration system 22 in the externally-powered filter mode is presented. As was previously the case, the example scenario begins at timepoint T0 with the E/H wheel loader 20 shutdown or placed in a non-working state at timepoint T1. Prior to timepoint T1, and as indicated by bars 156, 158, the intelligent work vehicle filtration system 22 operates in the battery-powered filter mode active with the battery pack 96 utilized to power the hydraulic pump 86. In this example scenario, the E/H wheel loader 20 transitions to off-duty usage concurrent with work vehicle plug-in occur at timepoint T1. Battery pack recharging also commences at this time, as indicated by bar 160. However, as indicated by bar 162, the controller architecture 48 does not place the intelligent work vehicle filtration system 22 in the externally-powered filter mode until a period of time after timepoint T1 and, specifically, at subsequently-occurring timepoint T2. In embodiments, the controller architecture 48 may establish timepoint T2 based upon (by back calculating from) an EAS time of the E/H wheel loader 20, which corresponds timepoint T3 in the present example. As described above, the controller architecture 48 may establish the EAS time and commence fine filtering of the hydraulic fluid (that is, place the intelligent work vehicle filtration system in the externally-powered filter mode) at a predetermined duration of time (e.g., a few hours) prior to the EAS time. Following this, when on-duty operation of the E/H wheel loader 20 recommences at timepoint T4, the intelligent work vehicle filtration system 22 returns to operation in the battery-powered filter mode, with the battery pack 96 powering the hydraulic pump 86, as denoted by bars 164, 166. Consideration of such scheduled-based concerns may thus beneficially prevent, or at least minimize unneeded energy expenditure and component wear in instances in which the E/H wheel loader 20 is maintained in an off-duty state for time periods exceeding approaching or exceeding 24 hours.

Enumerated Examples of the Intelligent Work Vehicle Filtration System

The following examples of intelligent work vehicle filtration systems are further provided and numbered for ease of reference.

1. In a first example embodiment, an intelligent work vehicle filtration system onboard an electric-hydraulic (E/H) work vehicle includes a hydraulic subsystem, a controller architecture, and an electric drive subsystem containing a battery pack. A hydraulic subsystem includes, in turn, a fine filter device having a first filter efficiency, a coarse filter device having a second filter efficiency less than the first filter efficiency, a hydraulic circuit in which the fine filter device and the coarse filter device are positioned, and a hydraulic pump controllable to circulate hydraulic fluid about the hydraulic circuit. During operation of the intelligent work vehicle filtration system, the controller architecture selectively places the intelligent work vehicle filtration system in an externally-powered filter mode in which hydraulic flow is directed through the fine filter device, while bypassing the coarse filter device, when the electric drive subsystem is electrically coupled to an external power supply utilized to charge the battery pack.

2. The intelligent work vehicle filtration system of example 1, wherein the controller architecture is further configured to selectively place the intelligent work vehicle filtration system in a battery-powered filter mode in which hydraulic flow is directed through the coarse filter device, while bypassing the fine filter device, when the hydraulic pump is powered utilizing the battery pack.

3. The intelligent work vehicle filtration system of example 2, wherein the hydraulic circuit includes a first flow loop in which the fine filter device is positioned and a second flow loop in which the coarse filter device is positioned in parallel with the fine filter device. Additionally, the intelligent work vehicle filtration system further includes a flow switch assembly controllable to route hydraulic flow through a selected one the first flow loop and the second flow loop.

4. The intelligent work vehicle filtration system of example 3, wherein the flow switch assembly includes a valve positioned in the hydraulic circuit. The valve is movable between: (i) a first position in which the valve permits hydraulic flow through the first flow loop and the fine filter device; and (ii) a second position in which the valve blocks hydraulic flow through the first flow loop and the fine filter device.

5. The intelligent work vehicle filtration system of example 4, wherein the controller architecture is configured to command the valve to move into the first position when the intelligent work vehicle filtration system operates in the externally-powered filter mode and into the second position when the intelligent work vehicle filtration system operates in the battery-powered filter mode.

6. The intelligent work vehicle filtration system of example 3, wherein the intelligent work vehicle filtration system is further operable in a coarse filter override mode in which the controller architecture controls the flow switch assembly to direct hydraulic flow through the first flow loop and the fine filter device when the E/H work vehicle is powered utilizing the battery pack.

7. The intelligent work vehicle filtration system of example 6, wherein the controller architecture is configured to place the intelligent work vehicle filtration system in the coarse filter override mode in response to detection of a fault associated with the second flow loop or the coarse filter device.

8. The intelligent work vehicle filtration system of example 6, wherein the controller architecture is configured to place the intelligent work vehicle filtration system in the coarse filter override mode in response to detection of excessive hydraulic fluid contamination.

9. The intelligent work vehicle filtration system of example 6, wherein the controller architecture is configured to place the intelligent work vehicle filtration system in the coarse filter override mode in response to receipt of operator input requesting activation of the coarse filter override mode.

10. The intelligent work vehicle filtration system of example 2, wherein the controller architecture is configured to vary an output of the hydraulic pump when transitioning the intelligent work vehicle filtration system from the externally-powered filter mode to the battery-powered filter mode.

11. The intelligent work vehicle filtration system of example 2, wherein a first pressure drop occurs across the fine filter device when the intelligent work vehicle filtration system operates in the externally-powered filter mode. Further, a second pressure drop occurs across the coarse filter device when the intelligent work vehicle filtration system operates in the battery-powered filter mode, the second pressure drop equal to or less than one half the first pressure drop.

12. The intelligent work vehicle filtration system of example 1, further including a hydraulic actuator fluidly coupled to the hydraulic circuit and controllable to move an implement of the E/H work vehicle.

13. The intelligent work vehicle filtration system of example 12, wherein the hydraulic actuator includes a hydraulic cylinder controllable to move a front end loader assembly of the E/H work vehicle.

14. The intelligent work vehicle filtration system of example 1, wherein the controller architecture is further configured to: (i) when the E/H work vehicle is off-duty and the electric drive subsystem is electrically coupled to the external power supply, establish an earliest anticipated start time at which on-duty usage of the E/H work vehicle is expected to recommence; and (ii) place the intelligent work vehicle filtration system in the externally-powered filter mode a predetermined duration of time prior to the earliest anticipated start time.

15. The intelligent work vehicle filtration system of example 1, wherein the hydraulic subsystem includes an actively-lubricated assembly fluidly coupled to the hydraulic circuit and selected from a group consisting of an actively-lubricated axle assembly and actively-lubricated drivetrain gearbox, the hydraulic pump urging lubricant flow through the actively-lubricated assembly during operation of the E/H work vehicle.

CONCLUSION

There has thus been provided systems and methods for strategically varying the filter performance and energy demands of hydraulic filtration subsystems onboard E/H work vehicles based, at least in part, on vehicle charging status. Generally, embodiments of the intelligent work vehicle filtration system selectively provide high performance, energy-demanding hydraulic filtration during off-duty charging of the E/H work vehicle when the E/H work vehicle is connected to a power grid or another external power source. Comparatively, during on-duty usage of the E/H work vehicle, the intelligent work vehicle filtration system is placed in a battery-powered filter mode in which hydraulic filtration is conducted at an purposefully-reduced efficiency or performance level to minimize the hydraulic pump load placed on the battery pack and to effectively extend the per-charge lifespan of the battery pack. In certain implementations, the work vehicle filtration system may also be operable in a coarse filter override mode, which may be activated in response to operate input commands, in response to detection of a fault associated with a coarse filter device or flow loop, or in response to detection to excessive hydraulic fluid contamination occurring during battery-powered operation of hydraulic subsystem. Finally, in certain embodiments, scheduling considerations may further be taken into account by the controller architecture in determining when placing the intelligent work vehicle filtration in the externally-powered filter mode.

As used herein, the singular forms "a", "an," and "the" are intentionally-grown to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intentionally-grown to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. An intelligent work vehicle filtration system onboard an electric-hydraulic (E/H) work vehicle, the intelligent work vehicle filtration system comprising:
   an electric drive subsystem containing a battery pack;
   a hydraulic subsystem, comprising:
      a fine filter device having a first filter efficiency;
      a coarse filter device having a second filter efficiency less than the first filter efficiency;
      a hydraulic circuit in which the fine filter device and the coarse filter device are positioned; and
      a hydraulic pump controllable to circulate hydraulic fluid about the hydraulic circuit; and
   a controller architecture coupled to the electric drive subsystem, the controller architecture having processing architecture configured to execute control logic to determine that the electric drive subsystem is electrically coupled to an external power supply and selectively place the intelligent work vehicle filtration system in an externally-powered filter mode in which hydraulic flow is directed through the fine filter device, while bypassing the coarse filter device, when the electric drive subsystem is electrically coupled to the external power supply utilized to charge the battery pack.

2. The intelligent work vehicle filtration system of claim 1, wherein the controller architecture is further configured to selectively place the intelligent work vehicle filtration system in a battery-powered filter mode in which the hydraulic flow is directed through the coarse filter device, while bypassing the fine filter device, when the hydraulic pump is powered utilizing the battery pack.

3. The intelligent work vehicle filtration system of claim 2, wherein the hydraulic circuit includes a first flow loop in which the fine filter device is positioned and a second flow loop in which the coarse filter device is positioned in parallel with the fine filter device; and wherein the intelligent work vehicle filtration system further comprises a flow switch assembly controllable to route the hydraulic flow through a selected one of the first flow loop and the second flow loop.

4. The intelligent work vehicle filtration system of claim 3, wherein the flow switch assembly comprises a valve positioned in the hydraulic circuit, the valve being movable between:

a first position in which the valve permits the hydraulic flow through the first flow loop and the fine filter device; and a second position in which the valve blocks the hydraulic flow through the first flow loop and the fine filter device.

5. The intelligent work vehicle filtration system of claim 4, wherein the controller architecture is configured to command the valve to move into the first position when the intelligent work vehicle filtration system operates in the externally-powered filter mode and into the second position when the intelligent work vehicle filtration system operates in the battery-powered filter mode.

6. The intelligent work vehicle filtration system of claim 3, wherein the intelligent work vehicle filtration system is further operable in a coarse filter override mode in which the controller architecture controls the flow switch assembly to direct the hydraulic flow through the first flow loop and the fine filter device when the E/H work vehicle is powered utilizing the battery pack.

7. The intelligent work vehicle filtration system of claim 6, wherein the controller architecture is configured to place the intelligent work vehicle filtration system in the coarse filter override mode in response to detection of a fault associated with the second flow loop or the coarse filter device.

8. The intelligent work vehicle filtration system of claim 6, wherein the controller architecture is configured to place the intelligent work vehicle filtration system in the coarse filter override mode in response to detection of excessive hydraulic fluid contamination.

9. The intelligent work vehicle filtration system of claim 6, wherein the controller architecture is configured to place the intelligent work vehicle filtration system in the coarse filter override mode in response to receipt of operator input requesting activation of the coarse filter override mode.

10. The intelligent work vehicle filtration system of claim 2, wherein the controller architecture is configured to vary an output of the hydraulic pump when transitioning the intelligent work vehicle filtration system from the externally-powered filter mode to the battery-powered filter mode.

11. The intelligent work vehicle filtration system of claim 2, wherein a first pressure drop occurs across the fine filter device when the intelligent work vehicle filtration system operates in the externally-powered filter mode; and wherein a second pressure drop occurs across the coarse filter device when the intelligent work vehicle filtration system operates in the battery-powered filter mode, the second pressure drop equal to or less than one half the first pressure drop.

12. The intelligent work vehicle filtration system of claim 1, further comprising a hydraulic actuator fluidly coupled to the hydraulic circuit, the hydraulic actuator being controllable to move an implement of the E/H work vehicle.

13. The intelligent work vehicle filtration system of claim 12, wherein the hydraulic actuator comprises a hydraulic cylinder controllable to move a front end loader assembly of the E/H work vehicle.

14. The intelligent work vehicle filtration system of claim 1, wherein the controller architecture is further configured to:

when the E/H work vehicle is off-duty and the electric drive subsystem is electrically coupled to the external power supply, establish an earliest anticipated start time at which on-duty usage of the E/H work vehicle is expected to recommence; and place the intelligent work vehicle filtration system in the externally-powered filter mode a predetermined duration of time prior to the earliest anticipated start time.

15. The intelligent work vehicle filtration system of claim 1, wherein the hydraulic subsystem comprises an actively-lubricated assembly fluidly coupled to the hydraulic circuit and selected from a group consisting of an actively-lubricated axle assembly and actively-lubricated drivetrain gearbox, the hydraulic pump urging lubricant flow through the actively-lubricated assembly during operation of the E/H work vehicle.

16. A method carried-out by a controller architecture included in an intelligent work vehicle filtration system onboard an electric-hydraulic (E/H) work vehicle, the E/H work vehicle including an electric drive subsystem and a hydraulic subsystem containing a hydraulic pump, the method comprising:

monitoring when the electric drive subsystem is electrically coupled to an external power supply utilized to charge a battery pack included in the electric drive subsystem; and based, at least in part, on whether the electric drive subsystem is electrically coupled to the external power supply, selectively placing the intelligent work vehicle filtration system in:

an externally-powered filter mode in which hydraulic flow is directed through a fine filter device contained in the hydraulic subsystem, while bypassing a coarse filter device further contained in the hydraulic subsystem; and a battery-powered filter mode in which the hydraulic flow is directed through the coarse filter device, while bypassing the fine filter device, to reduce energy demands placed on the battery pack when powering the hydraulic pump during operation of the E/H work vehicle.

17. The method of claim 16, wherein the hydraulic subsystem includes a hydraulic circuit having first and second flow loops;

wherein the fine filter device and the coarse filter device are positioned in the first and second flow loops, respectively;

wherein the method further comprises, via commands transmitted from the controller architecture to a flow switch assembly, controlling the flow switch assembly to selectively route the hydraulic flow through:

the first flow loop and the fine filter device when the intelligent work vehicle filtration system operates in the externally-powered filter mode; and the second flow loop and the coarse filter device when the intelligent work vehicle filtration system operates in the battery-powered filter mode.

18. The method of claim 16, further comprising selectively placing the intelligent work vehicle filtration system in a coarse filter override mode in which the controller architecture controls a flow switch assembly to direct the hydraulic flow through the fine filter device when the E/H work vehicle is powered utilizing the battery pack.

19. The method of claim 18, further comprising placing the intelligent work vehicle filtration system in the coarse filter override mode in response to detection of at least one of a fault associated with the coarse filter device, excessive hydraulic fluid contamination, or operator input requesting placement of the intelligent work vehicle filtration system in the coarse filter override mode.

20. The method of claim 16, further comprising, when the E/H work vehicle is off-duty and the electric drive subsystem is electrically coupled to the external power supply:
  establishing, via the controller architecture, an earliest anticipated start time at which on-duty usage of the E/H work vehicle is expected to recommence; and
placing the intelligent work vehicle filtration system in the externally-powered filter mode a predetermined duration of time prior to the earliest anticipated start time.

\* \* \* \* \*